(12) United States Patent
Scorgie

(10) Patent No.: US 11,389,024 B2
(45) Date of Patent: Jul. 19, 2022

(54) CUSHIONED BATH MAT

(71) Applicant: MindsInSync Inc., New York, NY (US)

(72) Inventor: Iain D. Scorgie, New York, NY (US)

(73) Assignee: MINDSINSYNC, INC., New York, NY (US)

(*) Notice: Subject to any disclaimer, the term of this patent is extended or adjusted under 35 U.S.C. 154(b) by 0 days.

(21) Appl. No.: 16/743,756

(22) Filed: Jan. 15, 2020

(65) Prior Publication Data

US 2021/0076857 A1    Mar. 18, 2021

Related U.S. Application Data

(63) Continuation-in-part of application No. 29/720,198, filed on Jan. 10, 2020, and a continuation-in-part of application No. 29/720,194, filed on Jan. 10, 2020.

(51) Int. Cl.
*A47G 27/02* (2006.01)
*B32B 5/26* (2006.01)
(Continued)

(52) U.S. Cl.
CPC ..... *A47G 27/0225* (2013.01); *A47G 27/0212* (2013.01); *A47G 27/0243* (2013.01);
(Continued)

(58) Field of Classification Search
CPC ............ A47G 27/0225; A47G 27/0212; A47G 27/0243; A47G 27/0256; A47G 27/0281;
(Continued)

(56) References Cited

U.S. PATENT DOCUMENTS 1,923,551 A * 8/1933 Murphy .................. D04G 3/02
428/37
2,759,865 A * 8/1956 Kolb .................. A47G 27/0256
428/37
(Continued)

FOREIGN PATENT DOCUMENTS

AU    2011101252 A4    10/2011
AU    2012100007 A4    2/2012
(Continued)

OTHER PUBLICATIONS

"Braid," Wikipedia, https://en.wikipedia.org/wiki/Braid, Mar. 30, 2020.*
(Continued)

*Primary Examiner* — Cheryl Juska
(74) *Attorney, Agent, or Firm* — Pillsbury Winthrop Shaw Pittman LLP

(57) ABSTRACT

The invention pertains to a cushioned mat, in particular bath mat, including a non-slip base material, a cushion layer secured to the non-slip base material, a surface layer arrangement secured to a surface of the cushion layer opposite to the non-slip base material. The surface layer arrangement includes a textile material layer and a flexible cable including a cushioned core and an outer sleeve formed form textile material, the flexible cable being braided with or tufted to the textile material layer. In embodiments the flexible cable is braided or woven to form ornamental patterns.

5 Claims, 8 Drawing Sheets

(51) Int. Cl.
 B32B 3/08 (2006.01)
 B32B 3/16 (2006.01)
 B32B 5/18 (2006.01)
 B32B 37/26 (2006.01)

(52) U.S. Cl.
 CPC ............ *A47G 27/0281* (2013.01); *B32B 3/08* (2013.01); *B32B 3/16* (2013.01); *B32B 5/26* (2013.01); *B32B 5/18* (2013.01); *B32B 2037/266* (2013.01); *B32B 2305/022* (2013.01); *B32B 2305/184* (2013.01); *B32B 2305/188* (2013.01)

(58) Field of Classification Search
 CPC ...... A47G 27/0412; B32B 5/526; B32B 5/18; B32B 2037/266; B32B 2305/184; B32B 3/08; B32B 3/10; B32B 3/14; B32B 3/16; B32B 3/263; B32B 2305/022; B32B 2305/188; B32B 5/26
 See application file for complete search history.

(56) References Cited

U.S. PATENT DOCUMENTS

| | | | | |
|---|---|---|---|---|
| 3,421,405 A | * | 1/1969 | Logrippo | B29B 17/0026 87/6 |
| 3,485,135 A | * | 12/1969 | St Germain | A47G 27/0256 87/6 |
| 3,505,154 A | * | 4/1970 | Logrippo | D04D 9/00 428/37 |
| 4,802,426 A | * | 2/1989 | Hinshaw | A47G 27/0256 112/412 |
| 5,367,965 A | * | 11/1994 | Earnhardt | D05B 23/00 112/235 |
| D876,123 S | * | 2/2020 | Scorgie | B29B 17/0026 D6/583 |
| 2005/0192158 A1 | | 9/2005 | Edwards | |
| 2011/0143083 A1 | * | 6/2011 | Scorgie | B32B 5/18 428/95 |
| 2012/0124740 A1 | * | 5/2012 | Castle | A47D 15/003 5/420 |
| 2012/0213962 A1 | * | 8/2012 | Scorgie | B32B 5/18 428/92 |
| 2013/0065043 A1 | * | 3/2013 | Teran | B32B 5/024 428/316.6 |
| 2013/0302604 A1 | * | 11/2013 | Branscomb | D02G 3/44 428/365 |
| 2014/0110645 A1 | * | 4/2014 | O'Kane | B66C 13/06 254/1 |
| 2014/0141198 A1 | * | 5/2014 | Teran | A47G 27/0225 428/138 |
| 2015/0064388 A1 | * | 3/2015 | Beyda | A47G 27/0412 428/74 |
| 2016/0025271 A1 | * | 1/2016 | Linge | A47K 3/003 362/253 |
| 2017/0013988 A1 | * | 1/2017 | S Relvas | A47G 27/0225 |
| 2018/0125277 A1 | * | 5/2018 | Sustar | B32B 7/12 |
| 2018/0280751 A1 | * | 10/2018 | Prybutok | B32B 5/32 |

FOREIGN PATENT DOCUMENTS

| | | | | |
|---|---|---|---|---|
| CN | 101961201 A | | 2/2011 | |
| CN | 201900762 U | * | 7/2011 | ............... B32B 5/18 |
| CN | 202234647 U | * | 5/2012 | |
| DE | 202006013996 U1 | * | 2/2007 | ......... A47G 27/0225 |
| JP | 3186933 U | * | 10/2013 | ............... B32B 5/18 |
| NZ | 598223 A | | 8/2012 | |
| WO | WO-2004021846 A1 | * | 3/2004 | ............ B32B 37/00 |
| WO | WO 2011/069158 A1 | | 6/2011 | |
| WO | WO 2011/090510 A1 | | 7/2011 | |
| WO | WO 2012/170872 A2 | | 12/2012 | |

OTHER PUBLICATIONS

"Couching," Wikipedia, https://en.wikipedia.org/wiki/Couching, Mar. 30, 2020.*
"Couching Instructions," Alabama Chanin Journal, https://journal.alabamachanin.com/2017/08/couching-instructions/, Aug. 24, 2017.*
GRIPTEX trademarks, Trademark Electronic Search System, USPTO, 2020.*
CN 201900762 U, Google translation, 2011.*
JP 3186933 U, JPO translation, 2013.*
1930s Antique American Handmade Braided Oval Rug—2'2Δ×3'9", Chairish—Outfitting Chic and Unique Homes, (© 2020), Retrieved from the Internet: URL: https://www.chairish.com/product/664509/1930s-antique-american-handmade-braided-oval-rug-22-39, [Retrieved on Jan. 10, 2020], 5 pages.
Search Report as issued in German Patent Application No. 10 2019 124 863.9, dated May 14, 2020.

* cited by examiner

CUSHIONED BATH MAT

FIELD

The invention relates generally to a mat and more particularly to a mat having a cushioned cabled surface layer.

BACKGROUND

A bath mat having a cushioned layer is described in WO 2011/069158 A1. The mat described includes a layer of an absorbent, quick-drying textile material, a layer of a viscoelastic polyurethane foam material having an open cell structure, and a nonslip base material. The layer of foam material is glued and/or sewed to the layer of textile material to form a textile and foam assembly. The nonslip base material is glued to the foam material opposite to the textile material. Thus, the nonslip base material rests on the floor when the mat is in use while the foam material forms an intermediate layer and the textile material and upper layer of the cushioned mat. The mat is typically used in bathrooms where the user stands with wet feet on the mat. It provides a very comfortable touch when in use and dries very quickly. The mat remains hygienic and attractive over a long time.

BRIEF DESCRIPTION OF THE DRAWINGS

The invention will now be further described with reference to the accompanying figures.

DETAILED DESCRIPTION

Figure 1:
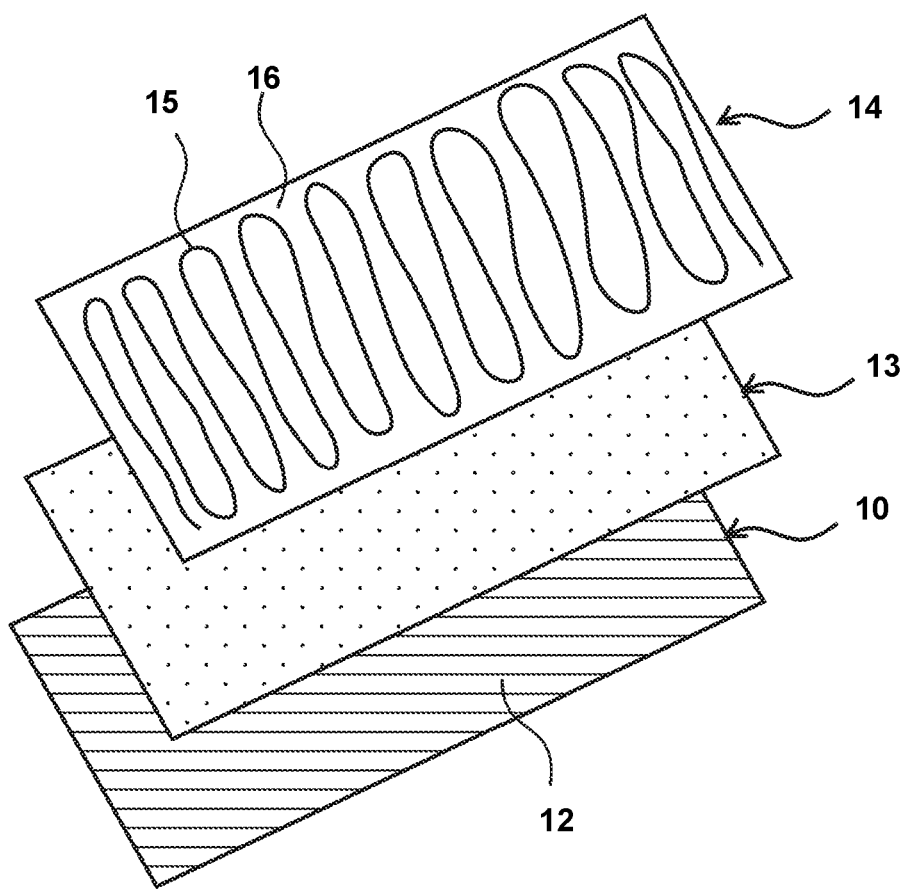
FIG. 1 shows an exploded view of a cushioned mat in accordance with an embodiment.
Figure 2:
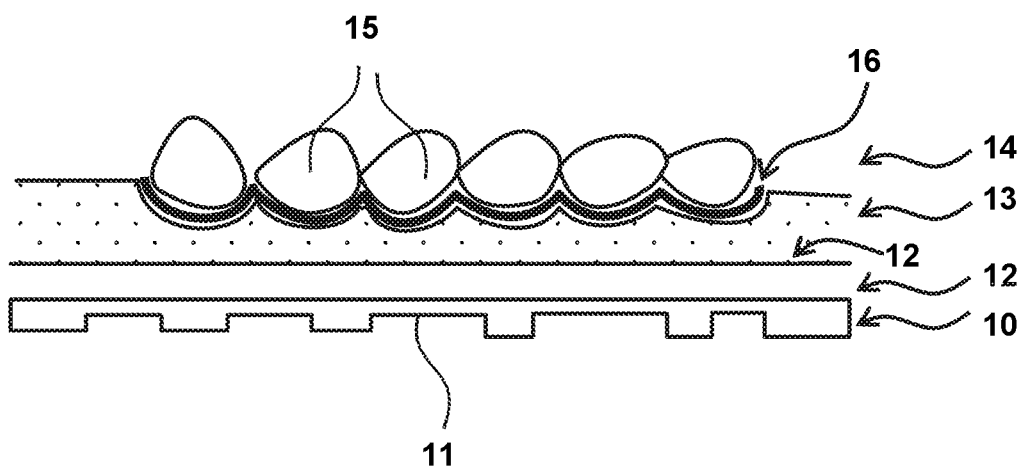
FIG. 2 shows a vertical cross section of a cushioned mat in accordance with an embodiment.

Referring to FIGS. 1 and 2, there is illustrated an article in the form of a mat in accordance with an embodiment. The mat includes a base 10 which is formed of slip resistant material. The base 10 is, therefore, referred to as a nonslip base material 10. The nonslip base material 10 may include a non-slip base sold under the mark GRIPTEX® material as available from MindsInSync (Hong Kong) Ltd. of Hong Kong, or a rubberized base such as a synthetic natural rubber, polyvinyl chloride, latex, spandex, or similar material. When the mat is in use the nonslip base material 10 rests on the floor or any other supporting surface on which the mat is used. Within this disclosure the surface of the nonslip base material 10 resting on the supporting surface may be understood to be the lower surface or resting surface 11.

On an upper surface 12 (opposite to the lower surface or resting surface 11) a cushion layer 13 is placed. The cushion layer 13 is secured to the nonslip base material by, for example, gluing and/or sewing. In an embodiment, the cushion layer 13 is glued in its entirety (glue layer 14) to the upper surface 12 of the nonslip base material 10 and may additionally be sewed at least at the circumferential edges of the mat. Alternately, these layers may be flame bonded.

The cushion layer 13 may be made of any cushion material, which may be a foam material, providing sufficient elasticity/compressibility and comfort. It may be (but not necessarily be) formed of a memory foam such as viscoelastic polyurethane.

Figure 3:
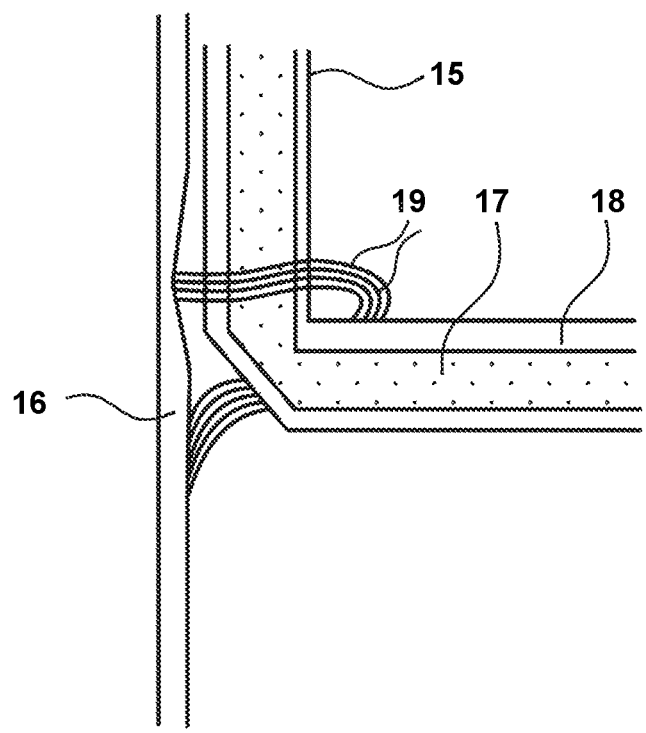
FIG. 3 illustrates an example of a manner of fastening a cable of the cushioned mat to the textile material layer.

The external/upper layer of the mat, which is the surface on which a person is most likely to step, kneel or sit, is provided as a surface layer arrangement 14. The surface layer arrangement 14 includes a cable 15 braided or tufted with a textile material layer 16 (FIG. 3). The textile material layer 16 may be woven or knitted fabric. When it is referred to "the cable 15" in this disclosure it is referred to a single cable or a sequence or an arrangement of two or more cables.

As best be seen from FIG. 3 the cable 15 is formed from a core 17 and an outer sleeve 18. The core 17 may again be formed from any cushion material. In an embodiment it is made of a memory foam such as viscoelastic polyurethane which may, for example, be an open cell foam. The outer sleeve 18 is formed from an absorbent textile material. The textile material layer 16 may be made form an absorbent textile material and in particular, may be made from the same material as the sleeve 18. For example either of them are both may be formed of polyester and polyamide, typically in the range of 75% to 85% polyester and 15% to 25% polyamide, more particularly 80% polyester and 20% polyamide. In embodiments, the sleeve 18 may be plush. The material will be explained in more detail in this disclosure below.

To form the cable 15 a core 17 of a continuous or varying diameter may be fed into the sleeve 18 that has already been sewn shut or is sewn shut afterwards. In particular the cable 15 may be made up of a 10 mm diameter continuous memory foam core 17 fed into the sleeve 18. The cable is then tied down during the weaving or knitting process onto the top textile material layer 16. Alternatively, the cable 15 may also be tufted to a top pre woven or knitted blanket. While the core is described as being round and having a diameter, it may likewise have different shaped cross sections.

The arrangements between the different layers 10, 13 and 14 of the mat is best shown in FIG. 2. The nonslip base material 10 forms a lower layer, the cushion layer 13 an intermediate layer and the surface layer arrangement 14 a top layer. In a further but not shown embodiment a barrier layer may also be provided between the surface layer arrangement 14 and cushion layer 13 to prevent moisture from reaching the cushion layer 13 from the surface layer arrangement 14. A barrier layer may even be provided between the core 17 and the sleeve 18.

The provision of the sleeve 18 on the external face means that, for example, when used adjacent a bath or shower, when a user steps out of the bath or shower and onto the mat, the mat absorbs moisture from the user immediately, drying the feet instantly as the fabric of sleeve 18 is a fast-absorbing material.

The provision of the core 17, which may be a compressible memory foam core, with the combination of the sleeve 18, the cushion layer 13, and nonslip base material 10 combine to provide a luxurious cushioned and absorbent feel to the mat when stood, kneeled or sat on, as well as a variety of ornamental designs.

FIG. 3 illustrates how the cable 15 may be braided with or tufted to the textile material layer 16. In particular the cable 15 intertwines with four ties 19 of the textile material layer 16 providing for good washability and durability of the mat. Further, the cable 15 is cabled by 90° around its longitudinal axis but may further be cabled, for example more than 180° round its longitudinal axis to provide for attractive ornaments.

The surface layer arrangement 14 is secured to the cushion layer 13 by, for example, gluing and/or sewing. As can be seen from FIG. 2, the surface layer arrangement 14 is embedded into the surface of the cushion layer 13 facing the surface layer arrangement 14 (i.e. the surface opposite to the nonslip base material 10). The cushion layer 13 may be a simple sheet which due to its properties naturally forms corresponding to the surface of the surface material layer 14 facing the cushion layer. However, the surface of the cushion layer 13 facing the surface material layer 14 may alternatively be provided with a surface structure corresponding to the surface structure of the surface of the surface layer arrangement 14 facing the cushion layer 13. This may be achieved by directly forming/foaming the cushion layer 13 onto the surface layer arrangement 14, for example. This may provide for a sufficient bonding of the surface layer arrangement 14 to the cushion layer 13. In principle, there need not be a separate cushion layer given that the cable itself The cushion layer 13 has a thickness of at least 30%, more particularly at least 40% and more particularly at least 50%, of the thickness of the surface material layer 14 in order to form the surface facing the surface material layer 14 as described above. In an embodiment prepared as a prototype the thickness was 6 mm with the 10 mm×10 mm core 17.

Figure 4:
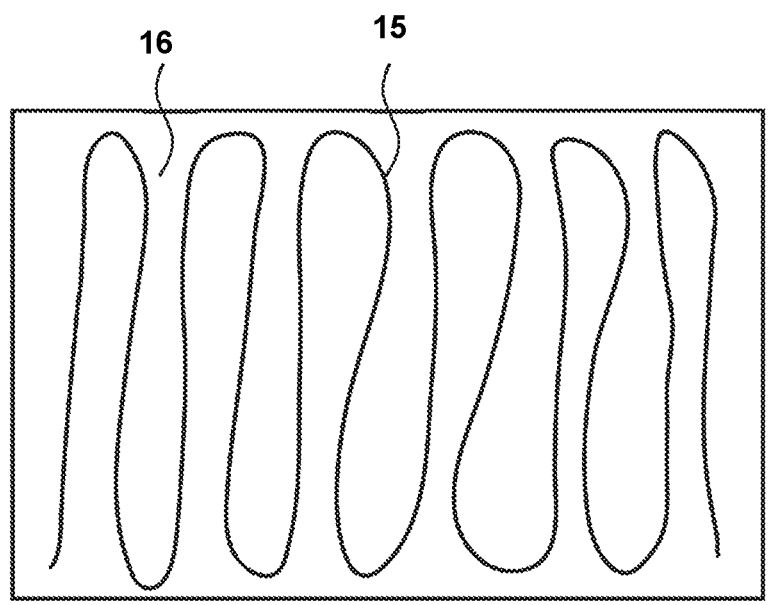
FIG. 4 shows a schematic top view of an embodiment of a weaving pattern for a mat in accordance with an embodiment.
Figure 5:
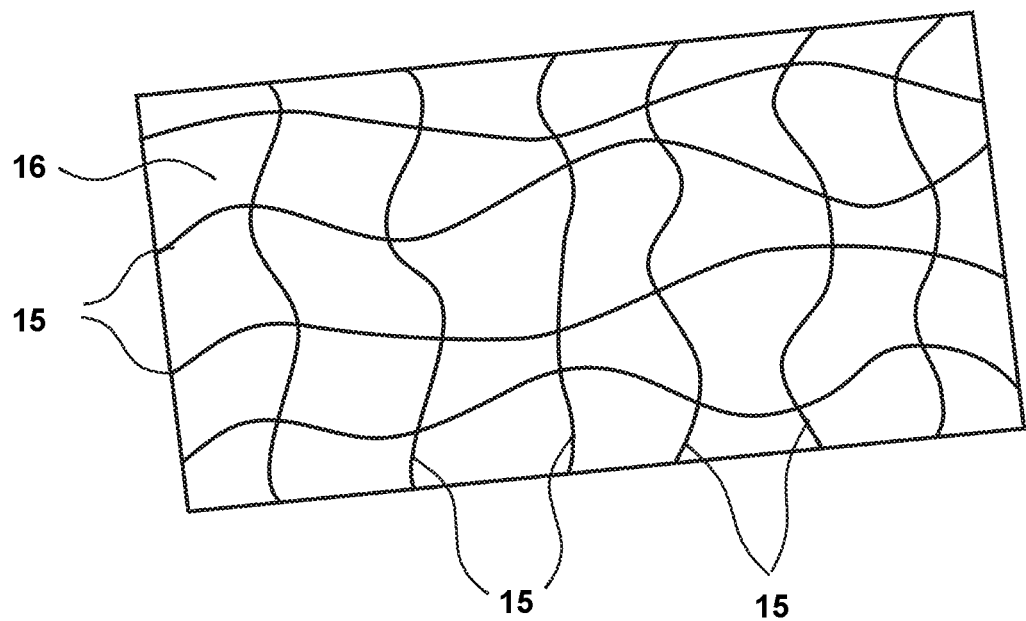
FIG. 5 shows a schematic top view of an embodiment of a second weaving pattern for a mat in accordance with an embodiment.
Figure 6:
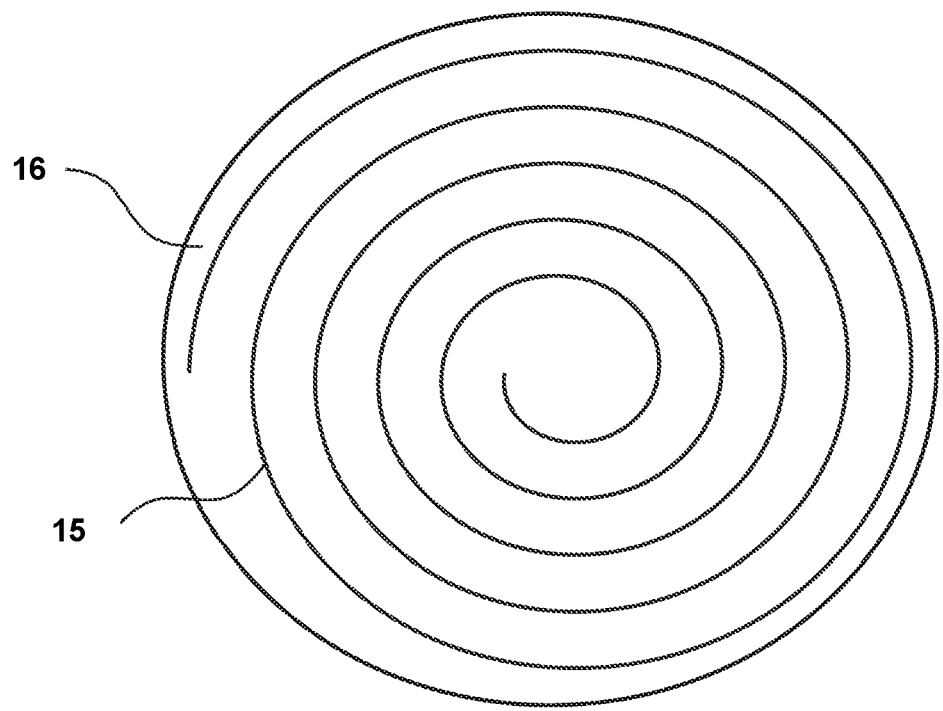
FIG. 6 shows a schematic top view of an embodiment of a third weaving pattern for a mat in accordance with an embodiment.
Figure 7:
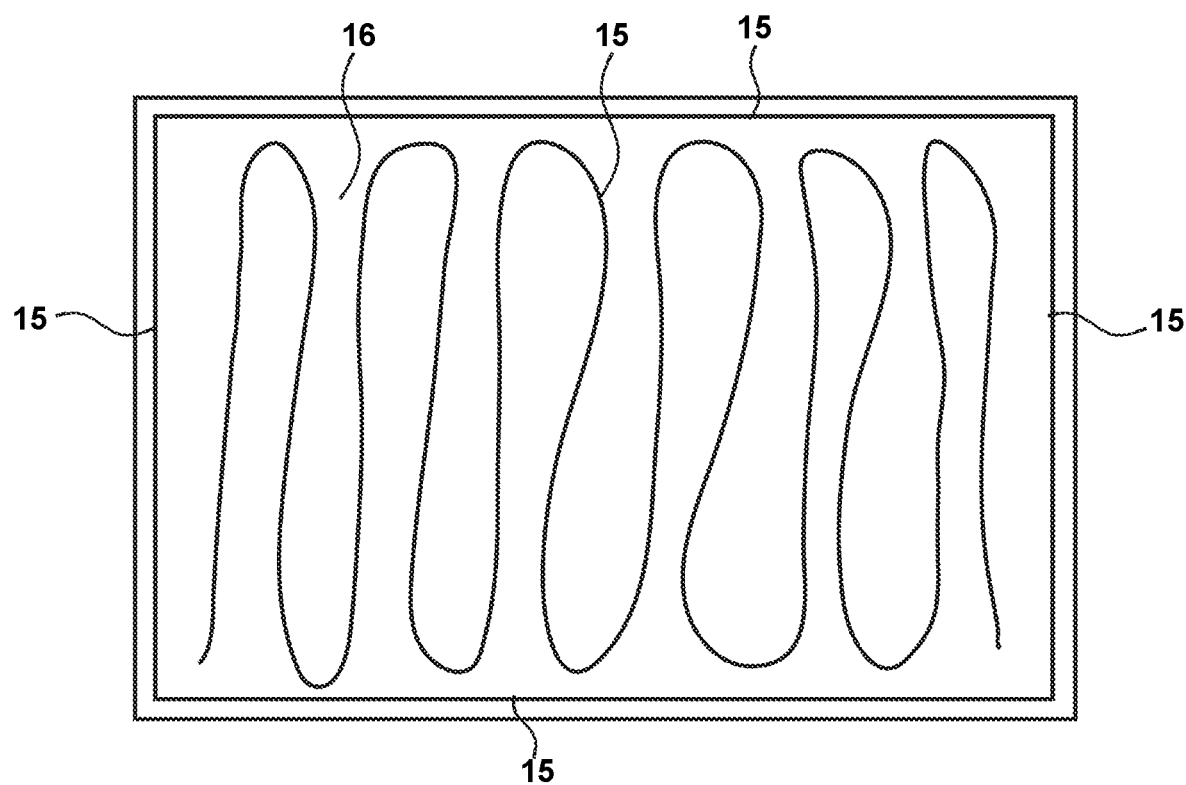
FIG. 7 shows a schematic top view of an embodiment of a fourth weaving pattern for a mat in accordance with an embodiment.
Figure 8:
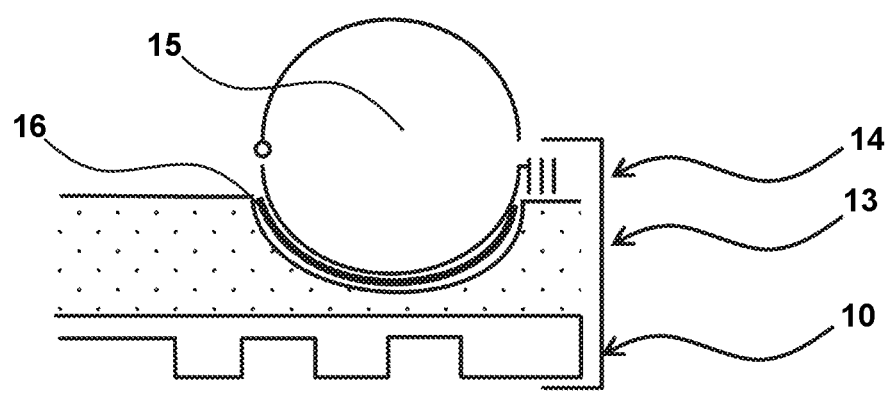
FIG. 8 a partial vertical cross section of the embodiment of FIG. 7.

Thanks to the present invention a number of varieties of ornaments is possible. In the example of FIG. 1 as well as of FIG. 4 the cable 15 is arranged sinuously in loops over the entire width of the mat. In the embodiment of FIG. 5 a number of cables 15 are arranged crosswise to one another. Each cable 15 may be arranged sinuously as shown or straight. FIG. 6 shows round mat with the cable 15 arranged as a spiral or helix. In the embodiment of FIGS. 7 and 8 the cable 15 is again arranged sinuously in loops over the entire width of the mat. (An) Additional cable(s) 15 is/are provided as an outer boundary or frame at the outer edges of the mat.

Figure 9:
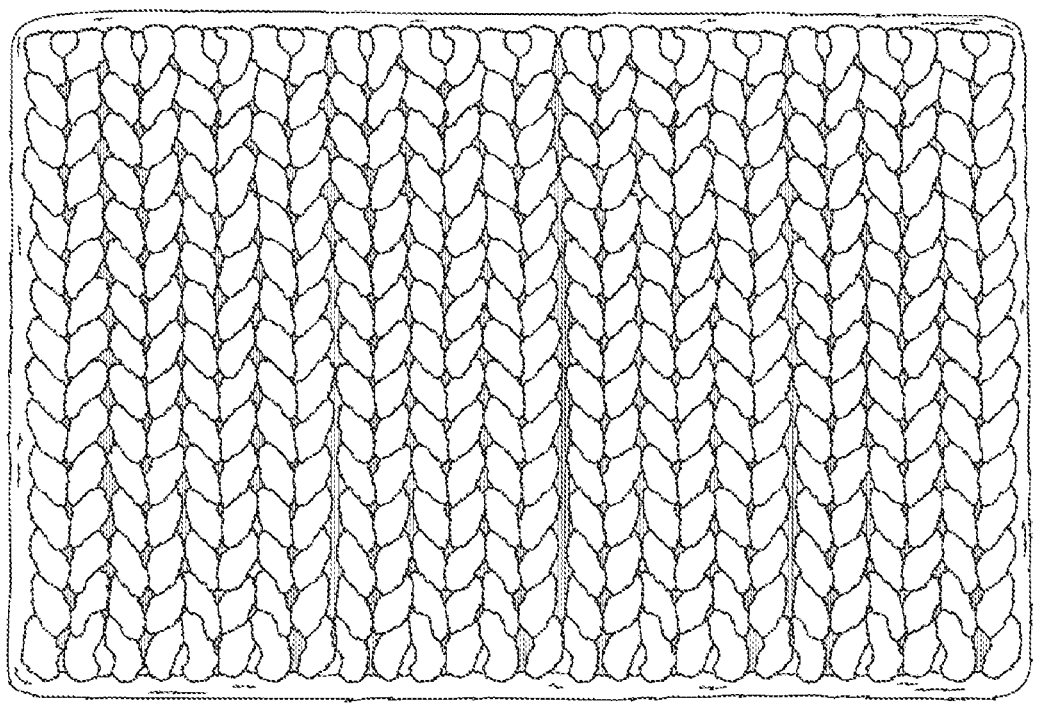
FIG. 9 shows a top plan view of a braided mat in accordance with an embodiment.
Figure 10:
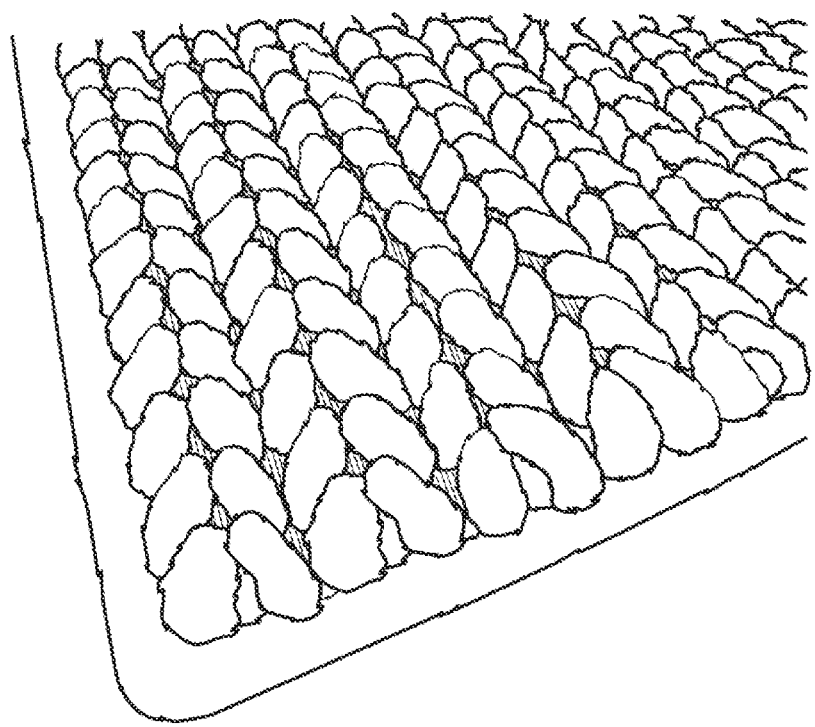
FIG. 10 shows an isometric view of a braided mat in accordance with an embodiment.
Figure 11:
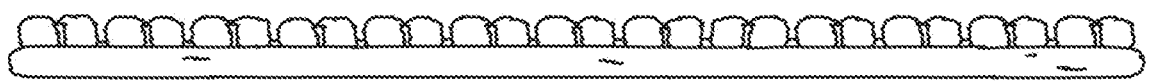
FIG. 11 shows a side plan view of a braided mat in accordance with an embodiment.
Figure 12:
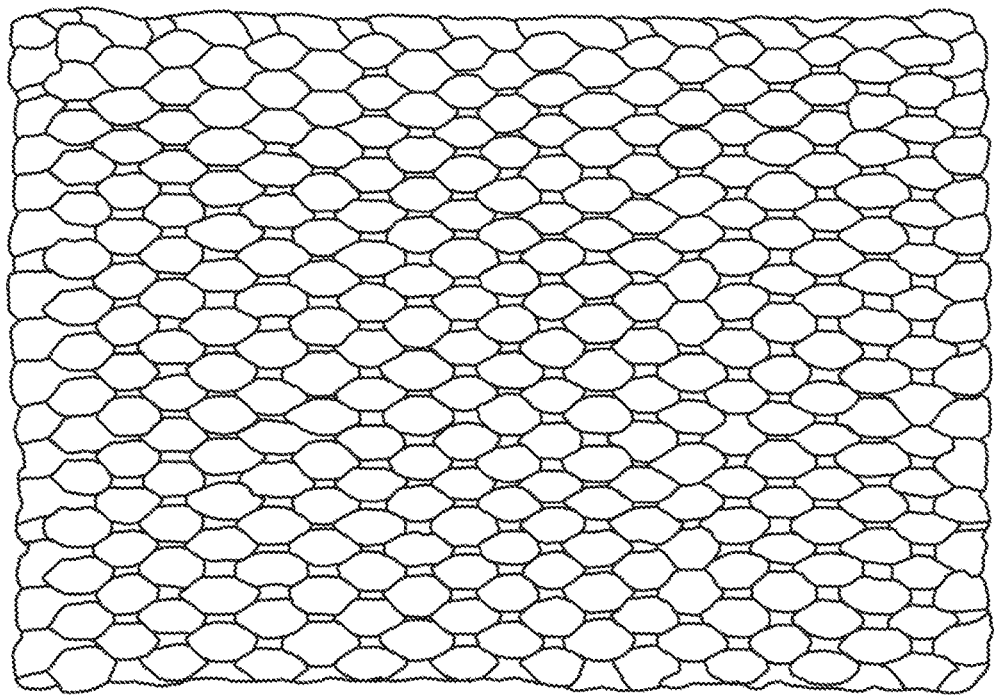
FIG. 12 shows a top plan view of a braided mat in accordance with an embodiment.
Figure 13:
FIG. 13 shows a side plan view of a braided mat in accordance with an embodiment.
Figure 14:
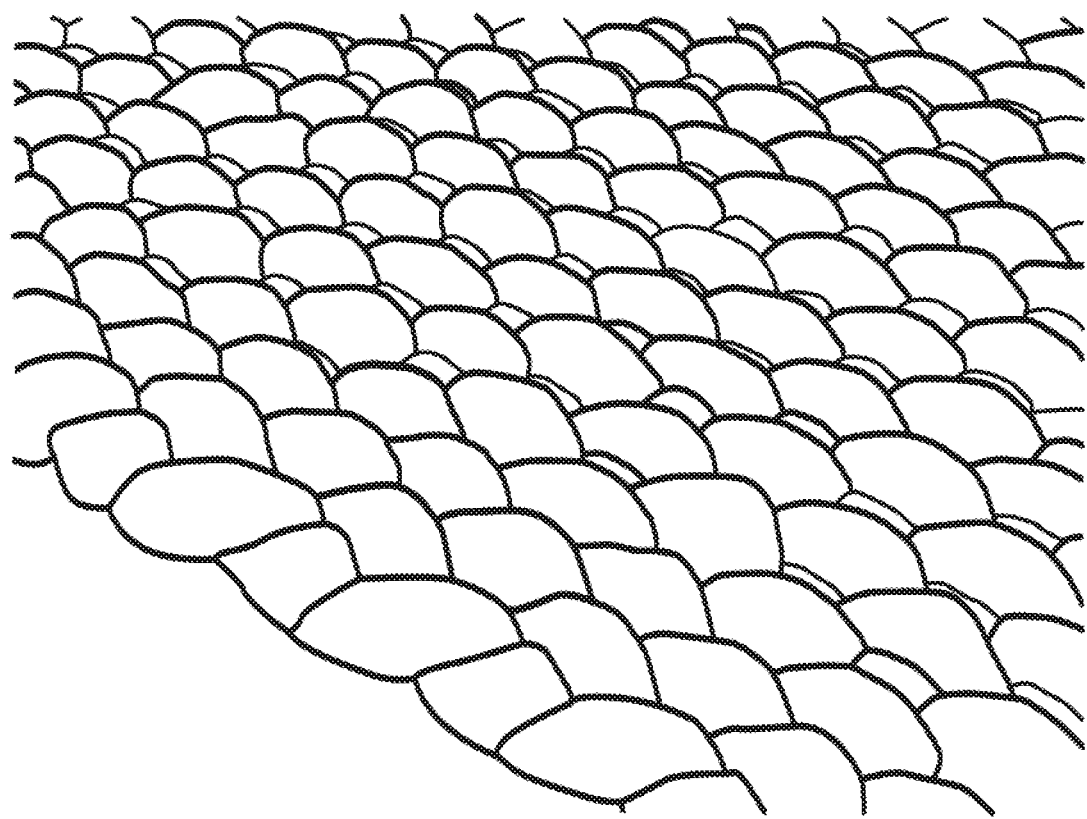
FIG. 14 shows an isometric view of a braided mat in accordance with an embodiment.

FIGS. 9-14 illustrate two different ornamental designs for the woven or braded cables 15. In FIGS. 9-11, the cables 15 are braided together in pairs, each pair extending across a dimension of the mat. While the braids are illustrated as extending across a shorter dimension of the mat, they may instead extend across the longer dimension of the mat. In FIGS. 12-14, the cables 15 are woven together in a variation on a plain weave. As with the braided version of FIG. 9, the weave may extend either along either of the long or short dimension of the mat. In principle, a basket, satin, or twill weave may be used, and indeed nearly any type of weave may be chosen in accordance with the designer's goals.

In an embodiment, the yarn used to form the textile material that forms the sleeve 18 and/or the textile material layer 15 may include a number of strands of fibres, which are divided out from a source fibre and then spun together with a plurality of additional fibres, to form the yarn. In an embodiment, this is a microfiber yarn. The provision of the yarn allows the strands and hence the material to be absorbent to water and thereby, rather than deflect liquid from the same, liquid is absorbed quickly and hence removes liquid from the other surface such as the user onto which the material has been applied and provides a drying effect on the other surface. Each fibre may have a diameter of the order of a few microns.

For example, an appropriate range may be 1 µm to 20 µm and a more particular useful range may be 5 µm to 10 µm. By way of comparison, this range may be thought of as being approximately 100 times finer than human hair and typically 100's of fibres will be used to form each piece of yarn. It will therefore be appreciated that each strand is particularly small in cross-sectional area and, each strand is then used, in combination with other strands, to form the textile material.

The weaving or knitting process to form the textile material from the yarn includes weaving or knitting the yarn together with other strands of yarn to form the textile material. In an embodiment, the woven material comprises a combination of strands of polyester and polyamide, for example, nylon. In particular, an embodiment includes from 60% to 90% polyester by weight with the remaining polyamide. In order to form a bath mat, a plurality of yarns are woven or knitted together to form the textile material that has very good absorbency and drying properties. In an embodiment, the fabric is woven or knitted into a material having a weight between 200 and 300 $g/m^2$ and in a particular embodiment, a material having a weight between about 250 and 275 $g/m^2$. A pile height may be approximately 2.5 mm to 4.5 mm, in particular approximately 4 mm.

As indicated above the layers of the mat are glued together. The glue should be selected to both provide a strong bond between the different material layers and be sufficiently flexible to allow for bending of the mat without significant cracking of the glue layer. In a particular embodiment, the glue should allow for moisture to pass from urethane foam to the textile material without blocking the wicking/drying function of the textile material. In a particular embodiment, the glue may be a sprayable upholstery glue suited for use with foam such as 680S, available from Tai Jia of Guangdong, China. As will be appreciated, a flame bonding process may be used in place of glue.

Embodiments of the mat may, for example, provide a durable and washable cushioned mat with a bright variety of surface ornamentation. In particular, the use of the surface layer including the textile material layer and the flexible cable including the cushioned core and outer sleeve, may allow the flexible cable to be braided with or tufted to the textile material layer.

Thanks to the flexible cable braided with the textile material layer a bright variety of surface ornaments may be produced. Braiding the cable with the textile material may provide for durability and washability of the mat.

To further improve the durability and washability of the mat the cable may be braided with at least two, and in some embodiments at least four ties at each intersection of the flexible cable with the textile material layer. In other words, between each intersection of the cable with the textile material layer at least two, and in some embodiments at least four ties of the textile material layer are provided to tie down the flexible cable.

In some embodiments, particularly useful ornamental designs may be produced if the flexible cable is cabled by at least 90°, and in some embodiments at least 180° around its longitudinal axis at at least some intersections. In some embodiments, the cable is cabled by at least 90° at each intersection with the textile material layer. Additionally or alternatively, the flexible cables may be arranged crosswise with one another. Further alternatively or additionally, the flexible cable may be looped around at least one tie, in some embodiments around at least two, and in some embodiments around at least four ties, of the textile material layer at at least some intersections, or at each intersection, with the textile material layer. All these combinations or alternatives may provide for a variety of ornamental appearances of the mat.

Although the invention has been described in detail for the purpose of illustration based on what is currently considered to be the most practical and particular embodiments, it is to be understood that such detail is solely for that purpose and that the invention in not limited to the disclosed embodiments, but, on the contrary, is intended to cover modifications that are within the scope of the appended claims.

For example, while the mat described and claimed herein is generally described as being a bath mat, it may be used as well for any other or any combination of uses, such as, changing mat, play mat, pet mat, seat cushion mat, stadium seat cushion mat, picnic seat cushion mat, yoga mat, sports mat, bedroom mat, kitchen mat, kitchen slice mats, computer arm rest mat, tug mat, shoe insoles, crib mat, mattress topper, garden mat, car mat, car seat mat.

The invention claimed is:

1. A cushioned mat, comprising:
   a non-slip base material;
   a cushion layer secured to the non-slip base material;
   a surface layer arrangement secured to a surface of the cushion layer opposite to the non-slip base material;
   the surface layer arrangement comprising a first textile material layer and a plurality of flexible cables each comprising a cushioned core and an outer sleeve formed from a second textile material, the flexible cable being tied to the first textile material layer of the surface layer to form an intersection thereof by ties of the first textile material layer wherein the flexible cables are woven in a plain weave.

2. The cushioned mat of claim 1, wherein the cushioned core comprises an open cell viscoelastic memory foam material.

3. The cushion mat of claim 1, wherein the cable is tied with at least two ties at each intersection of the flexible cable with the first textile material layer.

4. The cushioned mat of claim 1, wherein the cable is tied with at least four ties at each intersection of the flexible cable with the first textile material layer.

5. The cushioned mat of claim 1, wherein the cushioned mat is a bath mat.

* * * * *